Aug. 2, 1955
F. S. BUTLER
2,714,462
HAND TRUCK
Filed June 22, 1953
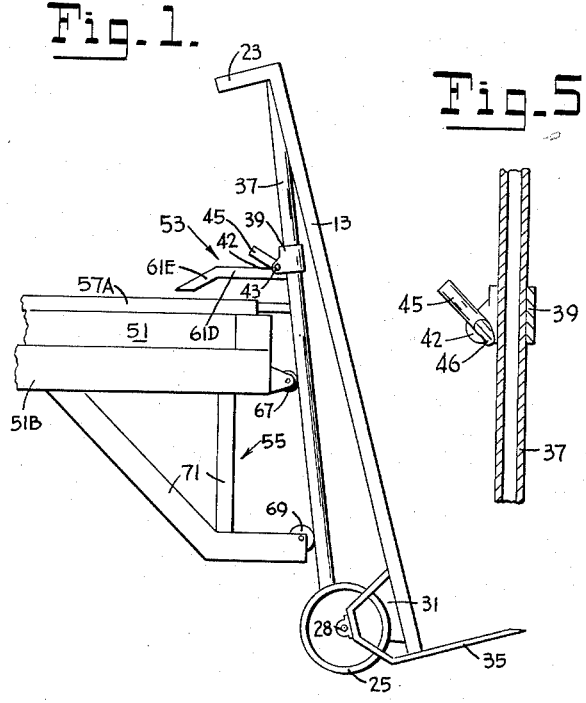
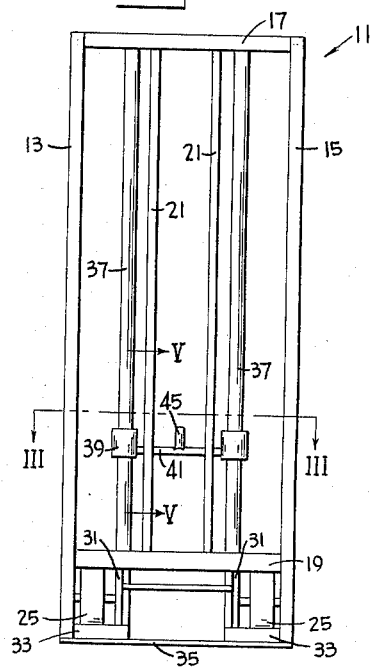
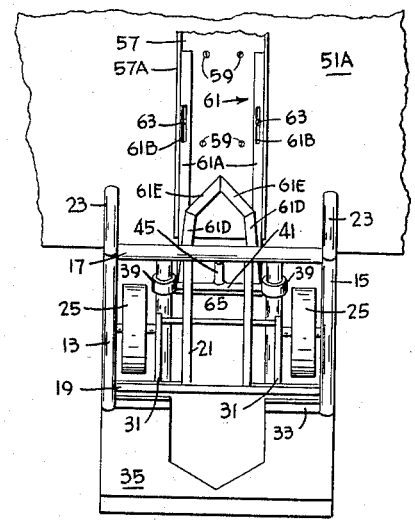
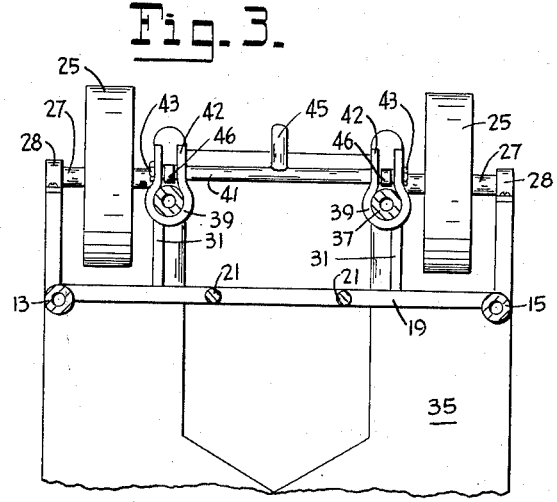
INVENTOR
FRAZIER S. BUTLER
BY
Weatherford and Weatherford
attys

United States Patent Office 2,714,462
Patented Aug. 2, 1955

2,714,462
HAND TRUCK
Frazier S. Butler, Memphis, Tenn.
Application June 22, 1953, Serial No. 363,357
8 Claims. (Cl. 214—515)

This invention relates to a hand truck, and more specifically relates to a hand truck adapted for safe and easy lowering from an elevated platform, vehicle tailgate, etc., by co-operating with mechanism mounted on the latter.

Specifically the invention relates to a hand truck and co-operating mechanism for safely and easily lowering the loaded hand truck from an elevated platform, said mechanism comprising a pair of parallel upright guide bars attached to the rear of said hand truck, a pair of guide sleeves slidable along said guide bars, a horizontal abutment-engaging bar extending between and rigidly connected to said guide sleeves, means operable by hand or foot for rotating said abutment-engaging bar, and lowering-controlling cam-type brake means associated and co-acting with said guide sleeves and guide bars and operable by rotation of said abutment-engaging bar.

While it has heretofore been proposed to provide means associated with a vehicle bed for lowering loads therefrom, such means have been of expensive and complicated construction, and have been difficult to use, requiring in most cases a hand-truck loading and unloading operation at each end of the lowering means. The present invention overcomes these faults of the prior art devices.

A principal object of the invention is to provide a hand truck having a very simple and easily operable device for lowering the same from a vehicle tailgate or other elevated platform.

Another object is to provide a hand truck having a highly effective and durable, yet inexpensive device, for lowering the loaded hand truck from an elevated platform.

A further object of the invention is to provide a hand truck which has a simple hand or foot operable brake controlled sliding device for lowering the truck from an elevated platform and which is easily maneuverable into engagement with a co-operating abutment device mountable adjacent on edge of said platform.

It is the overall object of the invention to generally improve the efficiency and design of hand trucks of the type disclosed.

The means by which the foregoing and other objects of the present invention are accomplished and the manner of their accomplishment will be readily understood from the following specification upon reference to the accompanying drawings, in which:

Fig. 1 is a side elevational view of a preferred embodiment of the invention.

Fig. 2 is a front elevational view of the hand truck proper.

Fig. 3 is an enlarged sectional plan view in section taken as on the line III—III of Fig. 2.

Fig. 4 is a plan view of the disclosure of Fig. 1.

Fig. 5 is an enlarged fragmentary vertical axial sectional view of one of the slide guides and brake mechanism taken on the line V—V of Fig. 2.

Referring now to the drawings, in which the various parts are designated by numerals, the numeral 11 generally designates the hand truck, which is basically of substantially conventional construction. Hand truck 11 comprises a pair of parallel side frame members 13 and 15, interconnected by upper and lower transverse frame members 17 and 19, respectively, welded thereto. A pair of load-support bars 21, evenly spaced between and parallel to side frame members 13 and 15, are rigidly attached to transverse frame members 17 and 19, as by welding. The frame members 13, 15, 17, 19 are preferably formed of metal tubing for optimum strength and light-weight. A pair of handles 23 are attached in any suitable manner to frame 13, 15, 17, 19 adjacent the upper corners thereof.

Hand truck 11 has the usual pair of wheels 25 with axles 27. Axles 27 are mounted at their outer ends in bearings 28 mounted on support frames 29 and at their inner ends in bearing bores formed in gusset plates 31 attached to the transverse frame member 19 and to the backing bars 33 attached to the toe plate 35. Toe plate 35 is also firmly attached to the lower ends of the side frame members. Toe plate 35 is provided with a rearwardly opening central cut-out notch to guidingly receive the guiding frame of the abutment device hereinafter described.

That part of the lowering mechanism carried by the hand truck comprises a pair of parallel tubular slide posts 37 attached at their upper ends to the transverse frame member 17. Tubular slide posts 37 are laterally symmetrically disposed between the frame members 13 and 15 and downwardly diverge rearwardly slightly away from the plane of the truck frame proper as shown. The lower ends of slide posts 37 are bent to conform to the outline of the rear and bottom edges of gussets 31 to which they are welded. The forward extremities of the bent lower ends of slide posts 37 are welded to the backing bars 33 of the toe plate 35.

Slidably embracing each of slide posts 37 is a sleeve 39. Each sleeve is provided with an opening through its rear wall and with a pair of parallel rearwardly and vertically disposed ears 42 on each side of said opening. Each ear 42 of each pair has a transverse bore therethrough, all four bores being horizontally alined to receive a shaft 41 rotatably held therein as by nuts 43 screwed onto the threaded ends of shaft 41. A short foot or hand engageable lever 45 is welded medially of the shaft 41 so as to normally extend rearwardly and upwardly therefrom for easy access thereto. Keyed or otherwise attached to that part of shaft 41 lying between the ears 42 of each sleeve 39 is a cam element 46, which upon rotation of shaft 41 counterclockwise (in Figs. 1 and 4) produces a braking or binding action between the tubular slide posts 37 and the sleeves 39. The vertical dimension of sleeves 39 is sufficiently large to insure against their binding on slide posts 37 due to an axial disalinement therebetween.

The part of the lowering mechanism mounted on the tailgate, vehicle bed or other elevated platform generally designated by numeral 51, comprises an abutment structure and a lower guide structure, respectively generally designated by numerals 53 and 55.

Abutment structure 53 comprises a base plate 57 preferably formed of sheet metal and having shallow upturned retainer guide flanges 57A along its sides. Base plate 57 may be fastened to floor 51A of platform 51 as by screws 59. The abutment member proper comprising a frame 61 is formed of a metal bar bent, or of bar sections integrally joined endwise as by welding, and has a pair of parallel base portions 61A adapted to lie on plate 57 against the upturned flanges 57A thereof. The portions 61A have longitudinal slots 61B therein for receiving headed screws 63 by which they are attached to plate 57 for limited longitudinal adjustment relative thereto. The frame 61 has upturned forward end portions, and reversely extending inwardly angled portions 61D, the latter lying in a plane slightly above and approximately parallel to that of the base plate 57. The rear ends of the bar portions 61D are connected by a downwardly and rearwardly pointed V-shaped bridge 61E. This V-shaped bridge 61E acts as a guide-cam to help center the hand truck over the abutment device 53 and to force the brake-controlling shaft 41 up onto the bar portions 61D, by which said shaft 41 and the brake sleeves are supported as the hand truck 11 is lowered to the ground from platform 51. To prevent shaft 51 from slipping off the front ends of frame portions 61D a substantially vertical stop plate 65 is attached to the front frame portions by welding or otherwise.

The lower guide structure 55 comprises an upper set of rollers 67 mounted on the end of the platform understructure 51B, and a second lower set of rollers 69 vertically alined therewith and mounted on brackets 71 bolted or welded to said platform understructure 51B. These rollers 67 and 69 form a somewhat tilted low-friction guide device for engaging the slide posts 37 as the hand truck 11 is lowered.

In use the hand truck 11, with its abutment-engaging brake elements (sleeves 39 and shaft 41) in their lowered position on slide posts 37, is guided by a worker toward the abutment structure 53, the wheels straddling the same. The abutment frame pointed end 61E will enter the notch in the toe plate and cam the latter to the left or right for perfect alinement of the truck and abutment structure to effect a balanced distribution of the load on the lowering mechanism. If the truck is being held in a position approaching the vertical, the shaft 41 will be relatively high and will be lifted only slightly, if at all, by the downwardly sloped bridge portion 61E of the abutment frame 61. However, if the hand truck 11 is greatly tilted rearwardly, the shaft 41 will engage the bridge portion 61E near its tip and will be raised or cammed up enough to ride on the portions 61D of said abutment frame 61. In either case the shaft will be arrested in its forward movement when it engages the stop plate or the end of abutment frame 61, at a time when the wheels are dropping over the edge of the platform 51. At this point the operator either by foot or manually depresses the lever 45 to actuate the brake mechanism. By easing off the force applied to lever 45, the truck 11 and its load can be slowly and safely lowered to the ground with minimum effort.

I claim:

1. In a hand truck, a pair of upright members, a pair of collars slidably embracing said members, a shaft rotatably mounted in portions of said collars offset from said members, cam means fixed to said shaft normally out of engagement with said members, and lever means connected to said shaft to rotate same and shift said cam means into member engagement, member engagement by said cam means effecting friction braking against relative sliding of said collars and members.

2. A hand truck comprising a normally upright body portion, and a lowering portion, said lowering portion comprising a pair of slide posts attached uprightly to the rear of said body portion, a slide sleeve embracing each of said slide posts and having a vertical slot in its side wall, a horizontally disposed shaft interconnecting said sleeves, journalled in bores therein and traversing said slots, cam-type brake elements attached to said shaft within said slots for engagement with said posts, a lever on said shaft for rotating the same and the brake elements mounted thereon, said shaft being adapted to support said hand truck while the same is lowered under control of said brake elements.

3. In combination, a hand truck, including a body frame, a pair of laterally located wheels and a toe plate extending forwardly therefrom; a pair of slide elements attached to the back of said body frame; a pair of sliding elements slidable along said slide elements; brake means controlling relative movement of said elements; a transverse shaft interconnecting said sliding elements for synchonizing their movements; an abutment device comprising an anchorage member attachable to a vehicle tailgate or like elevated platform, a rearwardly and downwardly tapered body portion adjustably mounted on said anchorage member, and means attached to said body portion adjacent its front end and extending upwardly therefrom so as to engage and stop said transverse shaft on said hand truck, whereby the latter can be lowered from said platform easily and safely under the control of said brake means.

4. Structure according to claim 3, and in which said body portion of said abutment device is a frame formed of metal bar sections, comprising parallel base sections, upright front sections rearwardly converging substantially horizontal support sections and shaft-lifting and guiding bridge sections rearwardly and downwardly converging at the rear of said support sections.

5. Structure according to claim 4, said toe plate being centrally recessed for guiding engagement with said body portion of said abutment body portion.

6. In a hand truck which includes a load engaging frame, control means connected to said frame, said control means comprising upright means connected to said frame, collar means slidably mounted on said upright means, said collar means including portions offset and projecting away from said upright means, said offset portions being apertured to provide shaft-journalling bores, a shaft journalled in said bores and spaced from said upright means, lobe-like cam means rigidly fixed to and rotatable with said shaft in alinement with said upright means, said cam means projecting eccentrically from said shaft a distance in excess of the spacing of said shaft from said upright means and being shiftable under shaft rotation into and out of engagement with said upright means, cam and upright engagement effecting friction braking limiting relative sliding between said collar means and said upright means, and means for effecting cam-shifting rotation of said shaft.

7. In a hand truck which includes a load engaging frame, control means connected to said frame, said control means comprising a pair of laterally spaced uprights connected to said frame, a pair of collars respectively slidably mounted on said uprights, said collars including portions offset from said collars and projecting away from said uprights, said offset portions being apertured to provide shaft-journalling bores, a shaft journalled in said bores spanning from collar to collar and spaced from said uprights, lobe-like cam means rigidly fixed to and rotatable with said shaft in alinement with said uprights, said cam means projecting eccentrically from said shaft a distance in excess of the spacing of said shaft from said uprights and being shiftable under shaft rotation into and out of engagement with said uprights, cam and upright engagement effecting friction braking limiting relative sliding between said collars and said uprights, and means for effecting cam shifting rotation of said shaft.

8. In a hand truck which includes a load engaging frame, control means connected to said frame, said control means comprising a pair of laterally spaced uprights connected to said frame, a pair of collars respectively slidably mounted on said uprights, said collars including portions offset from said collars and projecting away from said uprights remote from said frame, said offset portions being apertured to provide shaft-journalling bores, a shaft journalled in said bores spanning from collar to collar and spaced from said uprights, lobe-like cam means rigidly fixed to and rotatable with said shaft in alinement with said uprights, said cam means projecting eccentrically from said shaft a distance in excess of the spacing of said shaft from said uprights and being shiftable under shaft rotation into and out of engagement with said uprights, cam and upright engagement effecting friction braking limiting relative sliding between said collars and said uprights, and a lever connected to said shaft for effecting cam shifting rotation of said shaft.

References Cited in the file of this patent

UNITED STATES PATENTS

| | | |
|---|---|---|
| 575,769 | Porter | Jan. 26, 1897 |
| 2,407,655 | Di Santi | Sept. 17, 1946 |
| 2,449,424 | Stieber | Sept. 14, 1948 |
| 2,598,489 | Bayer et al. | May 27, 1952 |